United States Patent [19]

Webb

[11] 4,145,006

[45] Mar. 20, 1979

[54] WORK PIECE MOUNTING STAND

[76] Inventor: William E. Webb, 715 S. 16th St., Centerville, Iowa 52544

[21] Appl. No.: 850,737

[22] Filed: Nov. 11, 1977

[51] Int. Cl.² .............................................. B23Q 1/04
[52] U.S. Cl. ...................................... 269/69; 269/71; 269/76
[58] Field of Search ....................... 269/51, 71, 69, 45, 269/76, 74, 50

[56] References Cited

U.S. PATENT DOCUMENTS

| | | | |
|---|---|---|---|
| 1,474,212 | 11/1923 | Statham | 269/71 |
| 1,614,697 | 1/1927 | Snook | 269/51 |
| 2,019,789 | 11/1935 | Mahannah | 269/71 |
| 2,106,525 | 1/1938 | Henry | 269/71 |
| 4,058,302 | 11/1977 | Barrowcliff | 269/76 |

Primary Examiner—Robert C. Watson

Attorney, Agent, or Firm—Zarley, McKee, Thomte, Voorhees & Sease

[57] ABSTRACT

A professional mounting stand comprising an upstanding tubular support member having its lower end adapted to be secured to a supporting surface. A second tubular member is selectively slideably received by the first tubular member and is selectively rotatably mounted therein about a vertical axis. A normally horizontally disposed collar is pivotally secured to the upper end of the second tubular member and has a face plate selectively rotatably mounted therein about a horizontal axis. In one embodiment, a U-shaped support is secured to the face plate and has a pair of clamping members rotatably and laterally adjustably secured to the outer leg portions thereof. In a third embodiment, the horizontally disposed collar and face plate are secured to the upper end of a short length of pipe which is secured to a supporting surface.

7 Claims, 6 Drawing Figures

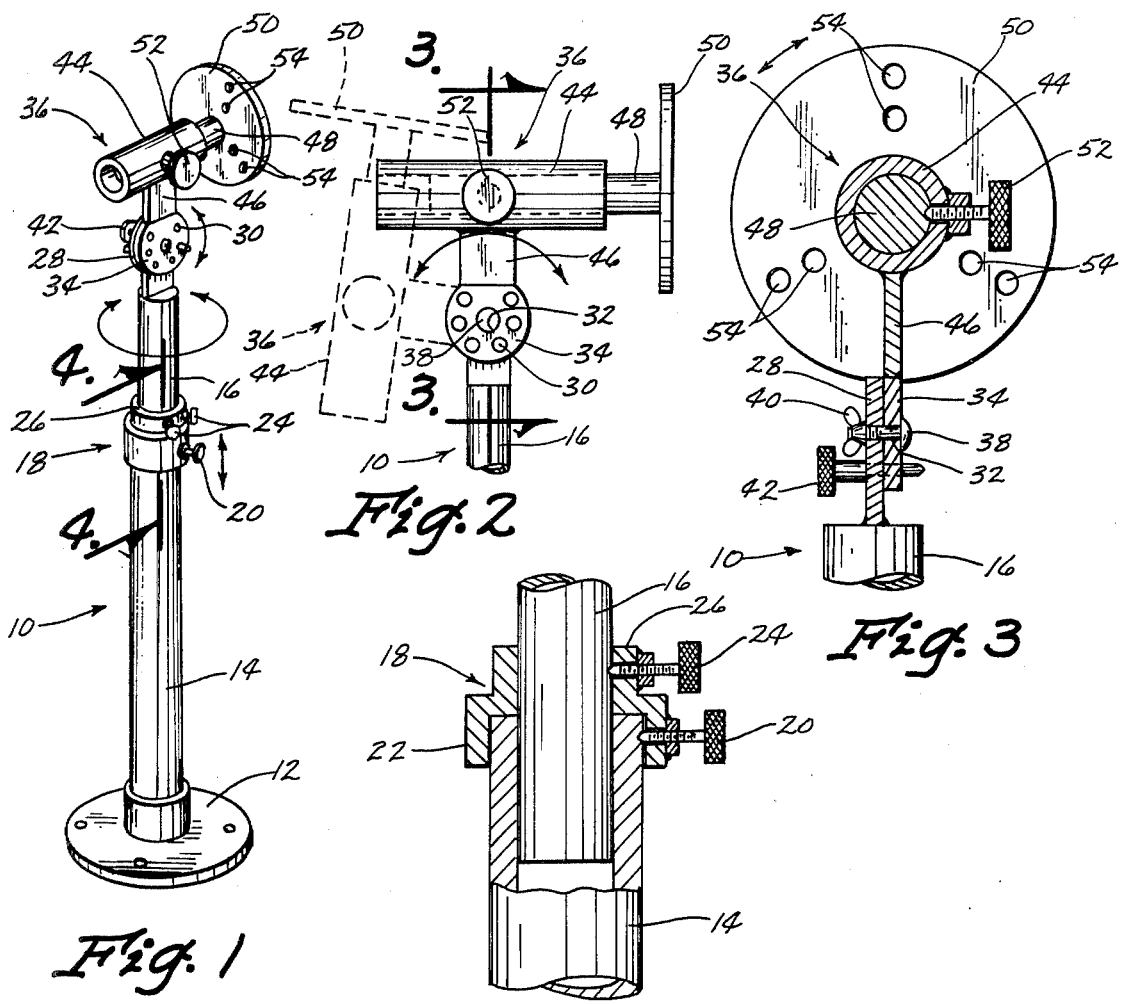
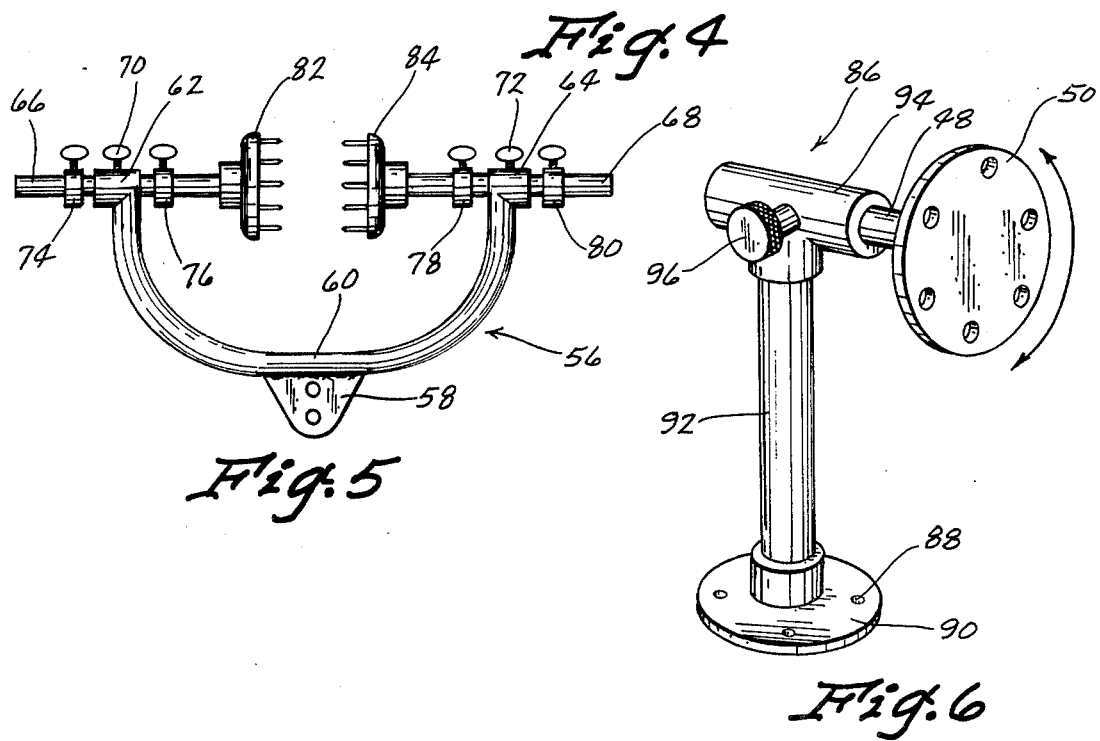

WORK PIECE MOUNTING STAND

BACKGROUND OF THE INVENTION

This invention relates to a professional mounting stand which is ideally suited for use in taxidermy endeavors.

In taxidermy work, it is extremely difficult to maintain the game head, bird, or animal in position while the taxidermist works thereon.

Therefore, it is a principal object to the invention to provide an improved mounting stand for taxidermists.

A still further object of the invention is to provide a mounting stand which permits the object mounted thereon to be raised or lowered, pivoted and rotated.

A still further object of the invention is to provide a mounting stand which is convenient to use.

A still further object of the invention is to provide a mounting stand which permits various different objects to be secured thereto.

A still further object of the invention is to provide a mounting stand adapted to support an animal therebetween and which may be pivoted and rotated with respect to the supporting surface.

A still further object of the invention is to provide a mounting stand which is economical of manufacture, durable in use and refined in appearance.

BRIEF DESCRIPTION OF THE DRAWINGS

FIG. 1 is a perspective view of one form of the invention:

FIG. 2 is a partial plan view of the embodiment of FIG. 1 with the broken lines illustrating the alternate position of the upper collar:

FIG. 3 is a sectional view seen on lines 3—3 of FIG. 2:

FIG. 4 is an enlarged sectional view seen on lines 4—4 of FIG. 1:

FIG. 5 is a plan view of an attachment for the embodiment of FIG. 1; and

FIG. 6 is a perspective view of a modified form of the invention.

DESCRIPTION OF THE PREFERRED EMBODIMENT

In FIG. 1, the numeral 10 refers generally to the mounting stand of the preferred embodiment. Stand 10 generally comprises a base plate 12 which is adapted to be secured to a supporting surface such as wood, concrete or the like in conventional fashion. Tubular member or post 14 is secured to base plate 12 and extends upwardly therefrom. Tubular member or post 16 is received by the upper end of post 14 and is selectively vertically mounted therein and selectively rotatably mounted therein about a vertical first axis by means of the collar attachment 18 illustrated in FIG. 4. As seen in FIG. 4, set screw 20 extends through collar portion 22 for engagement with the exterior surface of post 14 while set screw 24 extends through collar portion 26 for engagement with the exterior surface of post 16. Thus, through the use of the set screws 20 and 24, post 16 may be raised or lowered with respect to post 14 and may be rotated with respect to post 14.

A plate 28 is secured at the upper end of post 16 and is provided with a plurality of openings 30 formed therein along the periphery thereof as well as a central opening 32. Plate 34 of mounting means 36 is pivotally secured to plate 28 about a horizontal second axis by means of bolt 38 and wing nut 40 as best seen in FIG. 3. Plate 34 is provided with a plurality of openings formed therein which are adapted to register with the openings 30 in plate 28. The numeral 42 refers to a locking pin which is adapted to extend through the openings 30 in plate 28 and the openings in plate 34 to permit the selective pivotal movement of plate 34 relative to plate 28.

Collar 44 is secured to plate 34 by means of bar 46 and is disposed transversely with respect thereto. Pipe stub 48 is received by collar 44 and has face plate 50 mounted on the outer end thereof. Pipe stub 48 and face plate 50 may be moved inwardly and outwardly relative to the collar 44 and may be rotatably mounted relative to the collar 44 about a third axis and secured in various positions relative thereto by means of thumbscrew 52 as illustrated in FIG. 3.

In use, the mounting stand 10 is mounted on concrete floors or wooden floors in conventional fashion. When the device is going to be used for game heads, face plate 50 is removed from collar 44 by loosening thumbscrew 52. The face plate 50 is centered on the baseboard of the mannequin and attached thereto by means of screws or the like extending through openings 54 in the face plate 50. After the face plate has been attached to the mannequin, pipe stub 48 is inserted into collar 44 with thumbscrew 52 then being tightened. The mannequin is then ready for sculpturing or mounting. The mannequin may be rotated 360° by simply loosening the thumbscrew 52 and rotating the face plate and mannequin relative thereto with subsequent retightening of the thumbscrew 52. The angle of the mannequin may be adjusted by loosening wing nut 40 and removing pin 42. When collar 44 has been pivotally moved to the desired position such as indicated by broken lines in FIG. 2, the nut 40 is again tightened and safety pin 42 is reinserted through registering openings. The height of the mannequin is easily adjusted by means of the set screw 24 and may be rotated by means of the set screw 20.

FIG. 5 illustrates an attachment 56 which may be secured to the face plate 50 by bolts or the like. Conversely, the attachment 56 could be separately mounted on a supporting pipe or stand if desired. Attachment 56 comprises a plate 58 which may be secured to the face plate 50 by bolts or the like as described. A U-shaped support 60 is operatively secured to the plate 58 and has collars 62 and 64 provided at the ends thereof which are adapted to receive the rods 66 and 68 respectively. Set screws 70 and 72 are provided in collars 62 and 64 to permit the selective positioning of the rods 66 and 68 relative thereto respectively. Set screw collars 74 and 76 embrace rod 66 while set screw collars 78 and 80 embrace rod 68. Mounting pad assemblies 82 and 84 are provided on the inner ends of the rods 66 and 68 as illustrated in FIG. 5.

One possible use of the attachment 58 is to take a small mammal form, place the hide to be mounted on the form and place it in the desired position, belly up, between the pads 82 and 84. The form is mounted in place between the pads 82 and 84 by means of the set screw collars 74, 76, 78 and 80. The form can be rotated approximately 280° and locked with the set screws 70 and 72 which leaves both hands free for sewing.

The pad assemblies 82 and 84 may be reversed relative to the collar portions 62 and 64 so as to extend outwardly from the U-shaped member 60 for attaching fish for mounting, painting and for attaching flying birds for drying and finishing.

The bench stand 86 illustrated in FIG. 6 is adapted to be used for a wide variety of subjects. Stand 86 may be mounted on any bench with lag screws or the like extending through openings 88 in base plate 90. Post 92 extends upwardly from base plate 90 and has collar 94 secured to the upper end thereof. Collar 94 is adapted to receive the pipe stub 48 of base plate 50 in the embodiment of FIG. 1. The face plate 50 may be attached to a mannequinn baseboard and rotated 360° by loosening and then tightening set screw 96.

The bench stand 86 may be used in conjunction with the device 10 since the base plates are interchangeable. For example, after a game head has been mounted employing the device of FIG. 1, the face plate 50 may be removed therefrom and mounted in the collar 94 of the bench stand 86. This permits the device 10 to be used for additional work while allowing the previous mount to be out of the way for drying and finish work.

While the embodiments of this invention have been described as being ideally suited for mounting game heads, forms in taxidermy work, etc., it should be understood that the embodiments are also well suited for use in workshops, painting studios, etc. It can be seen that the embodiments of this invention permit objects to be supported thereby and to permit the objects to be moved to the desired location to facilitate work thereon. Thus it can be seen that the invention accomplishes at least all of its stated objectives.

I claim:

1. A mounting stand comprising,
   an upstanding support member having upper and lower ends,
   means at the lower end of said support member for securing said support member to a supporting surface,
   a mounting means at the upper end of said support means, first means for supporting said mounting means for rotation about a generally vertical first axis,
   second means for supporting said mounting means for pivotal movement about a generally horizontal second axis,
   third means for supporting said mounting means for rotation about a third axis directed generally perpendicular to said second axis,
   said third axis pivotally movable about said second axis through an angle of at least ninety degrees, and
   fourth means for supporting said mounting means for movement axially of said third axis.

2. The mounting means of claim 1 wherein said third and fourth means include a cylindrical collar supported coaxially of said third axis,
   a shaft rotatably and axially movably received within said collar, and
   said mounting means secured on one end of said shaft.

3. The mounting stand of claim 1 wherein said mounting means includes a face plate having a plurality of holes therein.

4. The mounting stand of claim 3 wherein said mounting means includes a U-shaped support having a plurality of holes adapted for registration with the holes of the face plate for attachment thereto, and opposing mounting pad members mounted on said U-shaped support for movement toward and away from each other to engage a work piece therebetween.

5. The mounting stand of claim 4 wherein said pad members are rotatably mounted on said U-shaped support.

6. A mounting stand comprising,
   an upstanding support member having upper and lower ends,
   means at the lower end of said support member for securing said support member to a supporting surface,
   a mounting means rotatably supported at the upper end of said support member,
   said upstanding support member comprising a first tubular member having a second tubular member selectively rotatably mounted thereon and selectively vertically movably mounted thereon and extending upwardly therefrom,
   a collar attachment for securing said second tubular member at selected rotational and vertical positions relative to said first tubular member, said collar attachment having a pair of connected concentric collar portions, each of a diameter for rotatably receiving a respective tubular member thereon, and
   means on said collar attachment for supporting said second tubular member at selected vertical positions while leaving said second tubular member free for rotational movement, said means on said collar attachment having lock means on each collar portion for securing said respective tubular member against rotational and vertical movement relative thereto.

7. The mounting stand of claim 6 wherein said second tubular member is telescopically received within said first tubular member, said collar attachment including an internal shoulder rotatably supported on the upper end of said first tubular member for rotatably securing said second tubular member at a selected vertical position when one of said pair of lock means is released.

* * * * *